US007650855B2

(12) United States Patent
Krishnamurthy

(10) Patent No.: US 7,650,855 B2
(45) Date of Patent: Jan. 26, 2010

(54) AUTOMATIC PET FEEDER

(76) Inventor: Sundararajan Krishnamurthy, 7N023 Bristol Ct., Saint Charles, IL (US) 60175

( * ) Notice: Subject to any disclaimer, the term of this patent is extended or adjusted under 35 U.S.C. 154(b) by 140 days.

(21) Appl. No.: 11/753,334

(22) Filed: May 24, 2007

(65) Prior Publication Data
US 2008/0289580 A1 Nov. 27, 2008

(51) Int. Cl.
A01K 5/02 (2006.01)
(52) U.S. Cl. ...................... 119/51.11; 119/54
(58) Field of Classification Search .............. 119/51.11, 119/51.04, 51.01, 51.02, 51.12, 53, 53.5, 119/54
See application file for complete search history.

(56) References Cited

U.S. PATENT DOCUMENTS

| 2,528,742 | A | * | 11/1950 | Coffing | 119/51.12 |
|---|---|---|---|---|---|
| 3,050,029 | A | * | 8/1962 | Appleton | 119/51.13 |
| 4,248,175 | A | * | 2/1981 | Navarro | 119/51.12 |
| 4,249,483 | A | * | 2/1981 | Sobky | 119/51.12 |
| 4,421,059 | A | | 12/1983 | Cousino | |
| 4,450,790 | A | * | 5/1984 | Stansbury, Jr. | 119/51.12 |
| 4,501,229 | A | | 2/1985 | Williamson | |
| 4,617,874 | A | * | 10/1986 | Zammarano | 119/51.12 |
| 4,640,229 | A | * | 2/1987 | Swartzendruber et al. | 119/51.11 |
| 4,671,210 | A | | 6/1987 | Robinson et al. | |
| 4,735,171 | A | * | 4/1988 | Essex | 119/51.12 |
| 4,805,560 | A | | 2/1989 | Knego et al. | |
| 4,981,106 | A | * | 1/1991 | Nagatomo | 119/51.11 |
| 5,003,920 | A | * | 4/1991 | Miksitz | 119/163 |
| 5,074,248 | A | * | 12/1991 | Loader | 119/505 |
| 5,078,097 | A | * | 1/1992 | Chisholm | 119/51.13 |
| 5,105,767 | A | * | 4/1992 | Gordon et al. | 119/57.92 |
| 5,150,664 | A | | 9/1992 | Kirk | |
| 5,176,103 | A | | 1/1993 | Reid et al. | |
| D335,370 | S | | 5/1993 | Kirk | |
| 5,222,461 | A | * | 6/1993 | Haynes | 119/62 |
| D339,429 | S | * | 9/1993 | Reid et al. | D30/121 |
| 5,370,080 | A | * | 12/1994 | Koepp | 119/51.11 |
| 5,377,620 | A | * | 1/1995 | Phillippi | 119/51.12 |
| 5,467,738 | A | * | 11/1995 | Cass | 119/61.53 |
| 5,588,394 | A | * | 12/1996 | Balistreri | 119/51.11 |
| 5,975,024 | A | * | 11/1999 | Sheaffer | 119/477 |
| 6,145,472 | A | * | 11/2000 | Vittuari et al. | 119/51.5 |
| 6,349,671 | B1 | | 2/2002 | Lewis et al. | |
| 6,766,766 | B1 | * | 7/2004 | Elliott | 119/57.92 |
| 2006/0219187 | A1 | | 10/2006 | Krishnamurthy | |

FOREIGN PATENT DOCUMENTS

| EP | 505049 A1 | * | 9/1992 |
|---|---|---|---|
| GB | 2037140 A | * | 7/1980 |
| GB | 2214329 | * | 8/1989 |

* cited by examiner

Primary Examiner—Yvonne R. Abbott
(74) Attorney, Agent, or Firm—Cook Alex Ltd.

(57) ABSTRACT

An automatic pet feeder is provided for feeding pets predetermined quantity of food or medication at predetermined times while the owner is absent or otherwise engaged. The pet feeder comprises a base, a feeding bowl with pie shaped divisions, a timer module, a bowl cover, handle to bowl cover and locking mechanism to hold the entire unit in place. A timer is provided with voice recording facility and also initiates programmed feeding schedules. The programming of the timer determines when the feeder cover is indexed so that the pet may have access to the food provided in it. This programming can be done through the timer interface RF or IR remotes and or through an USB port interface to a computer.

16 Claims, 6 Drawing Sheets

AUTOMATIC PET FEEDER

FIELD OF THE INVENTION

This invention is for use in the pet industry and in laboratories. This invention can be used to feed dry food, canned food and medication for pets. It can also be used by pet owners to reinforce good behavior and also be connected to training and exercise devices. The device can be actuated at specific times and or by remote means by the pet owner.

BACKGROUND OF THE INVENTION

The pet industry and the pet owners have gradually begun to realize the benefits of an automated feeding device. Pets have in general similar problems that humans face such as obesity, diabetes, stomach problems etc. The automated feeding machines can provide for the care of such pets. There are several automated pet feeders in the market that feed kibbles and several that are capable of feeding canned food. Feeding kibbles does not have issues of food spoilage, whereas feeding canned food does. Canned food cannot be left in a device for prolonged periods as they will spoil.

Pets also tend to be restless when the owners are not at home. They become hyperactive when the owners return. This issue of boredom is addressed in US Published Appln. No. 2006/0219187, titled "Automatic Pet Trainer," which requires a device to feed the pet to reinforce behavior of playing when the owner is not at home. The device in this published application will satisfy the needs of this pet trainer machine. Sometimes it is necessary for the pet owner or pet behavior researcher to reinforce pet behavior by providing food for certain things that they may want the pet to do. Examples of this maybe, making sure that outdoor cats come back home at a certain time and this can be rewarded by setting off a door switch which in turn can trigger the feeder to release food for reinforcement.

U.S. Pat. No. 6,349,671 describes a pet feeding system and method which uses the same device catering to the needs of a multi-pet household. This machine is designed to deal with more than one pet in a household that have different diets for different pets. This device helps feed two pets at a pre-determined time in the absence of the owner. This device comprises of a dish with four compartments which opens to feed the pet at a given time, and this is accomplished by a control unit that recognizes the pet that has to be fed. This is done through a sensor placed on the pet collar.

U.S. Pat. No. 5,176,103 describes a rotary pet feeder with a rotating cover on four pie shaped bowls. This feeder is designed to operate at fixed cycles and does not give the owner flexibility to provide for food or medication at specific times of the day or for multiple days. The machine does not provide for the ease of battery replacement, nor does it prevent the pets from accessing other compartments of the feeder when they are closed. It has been well known that pets can smell the presence of food and will attempt, any way possible, to gain access to the food even to the extent of destroying the machines that feed them. This is a major disadvantage in a real time environment where pets are creative and smart enough to figure out how to open the cover and eat all they want. This would not serve the function that the machine is designed and that is to feed the pets in a controlled fashion.

U.S. Pat. No. 5,222,461 discloses another form of rotary feeder specifically designed to feed pets when they want to be fed. The device is a torsion spring activated device, wherein the pet owner winds a spring and places pet food in a rotary tray. As and when the pet requires food, they have to activate a paw switch to gain access to the different food compartments. This invention is titled "Animal Activated Feeder," and that is what it is designed to do. In today's environment of obesity and diabetic problems in pets, like their human counterparts, this machine will not serve the pet industry in maintaining the health of the pet.

U.S. Pat. Nos. 5,150,664 and D 335,370 describe a machine that is a rotary feeder designed to feed controlled amounts of food at different points in time for the pet to feed. This device is a mechanical device with an electric motor wherein the control mechanics takes place through the activation of a multitude of gears and cams. The complexity of parts and assembly of these mechanical components tends to increase cost and creates assembly problems. The greater the number of parts the greater the probability of the machine having reliability issues. Secondly, the timer is housed outside the device, which prevents pets from accessing the food conveniently from the outside of the feeder and also prevents the feeder from having a maximal number of food compartments. As the timer mechanics require space on the outside of the feeder, increasing the number of food compartments (from 5 to 6, 7 or 8) would cause one of the pie shaped food compartments to fall within the area where the timer is, and thus prevent the pet from completely accessing the food compartment directly behind the timer. Also, as the timer is on the outside of the feed device, the likelihood increases that the pets will try to chew the timer cover and the components below attempting to get to the food. Another disadvantage is that as the cover index mechanics are operated by a cam type device, the cover is more likely to move fast and make quite a bit of noise. This may hurt the pet if the pet has its face within the pie shaped food container at the very moment the device decides to open another food compartment.

U.S. Pat. No. 4,805,560 describes a rotary feeder that can feed food and water to the pet. The unit does not provide for a flexible feeding schedule. It provides for feed cycles at fixed intervals. The food tray is indexed against a fixed opening which requires a high torque motor to carry the weight of the food and water at every index. As the device is circular and all the food/water is stored in the different pie shaped compartments, weight imbalance occurs whenever a section of the pie is empty. Density of the food and density of water could also cause imbalance in the system. This will cause the motor and bearings to take uneven loading whenever a section of the pie compartment is empty. The device is designed to operate on AC household current, which is not safe in an environment where water is present. This increases the likelihood of shocking or even electrocuting the pet in the event the pet drools on in this area and/or if the water gets to the live components.

U.S. Pat. No. 4,671,210 describes an animal feeder with the purpose of feeding pets at periodic intervals. This design is similar to that of U.S. Pat. No. 4,805,560, wherein the food compartments are indexed. This has the same design problems faced in U.S. Pat. No. 4,805,560, such as need for greater power, weight imbalance and safety of the pet. However, this machine has load bearing problems only on the center hub where the feeder bowl rotates and there is no load issue at the motor end.

U.S. Pat. No. 4,501,229 is also a rotary style automatic feeder with the food compartments indexed to accomplish the task of feeding the pet. This machine is set to operate or index at preset cyclic hourly intervals and has the same design concern of prior two patents discussed above. The indexing of the bowl in this machine is however actuated by a solenoid and hence the bowl would move in a fast quick movement, from one position to another during index. The speed at which this index happens could be a safety hazard to the pet.

U.S. Pat. No. 4,421,059 is a rotary feeder similar to the others described above with the exception that the bowl where the food is contained is spring loaded at the beginning of the feed cycle. The bowl is filled with food and placed in the machine and then rotated to load the torsion spring (stored energy). The solenoid plunger is activated at preset cyclic hourly intervals to release the torsion energy built into the bowl axis, thereby enabling the bowl to rotate and index to the next position. This has similar issues as described in U.S. Pat. Nos. 4,501,229 and 4,671,210 and 4,805,560.

Although the concept of automated feeding pets is addressed by these devices, these devices do not overcome the problems that are related to feeding and/or medicating at specific times, possible damage caused by pets to gain access to food compartments and the requirements of power consumption. Ease of use by the consumer/pet owner and portability has not been addressed. None of the above devices allow for use by integrating with other devices to train or reinforce pet behavior.

SUMMARY

The device of the present invention relates to an automatic pet feeder which has an integrated timer control module and pie shaped bowl for feeding pets at preset programmed times. The device consists of a minimal number of parts and, in the event of a failure, the parts can be easily replaced by the consumer in a matter of minutes. The electronics of the device are housed in a single module which can be upgraded and/or customized to the requirements and needs of the consumer as time passes. Ease of cleaning, maintenance and replacement of parts are facilitated, as the components are all made in plastic. The device operates with 3 AA batteries that can be replaced without removing or disassembling any part of the machine. The device, according to the present invention, will provide the pet owner with the ability to program the timer module to his or her convenience, and have a lock-down feature to prevent the pets from accessing the other compartments of the feeder. The timer module is able to communicate with external devices so that it can be controlled by a computer, gates, doors, sensors such as infrared, proximity, motion etc and other devices, such as a hand held remote.

DETAILED DESCRIPTION OF DRAWINGS

Figure 1:
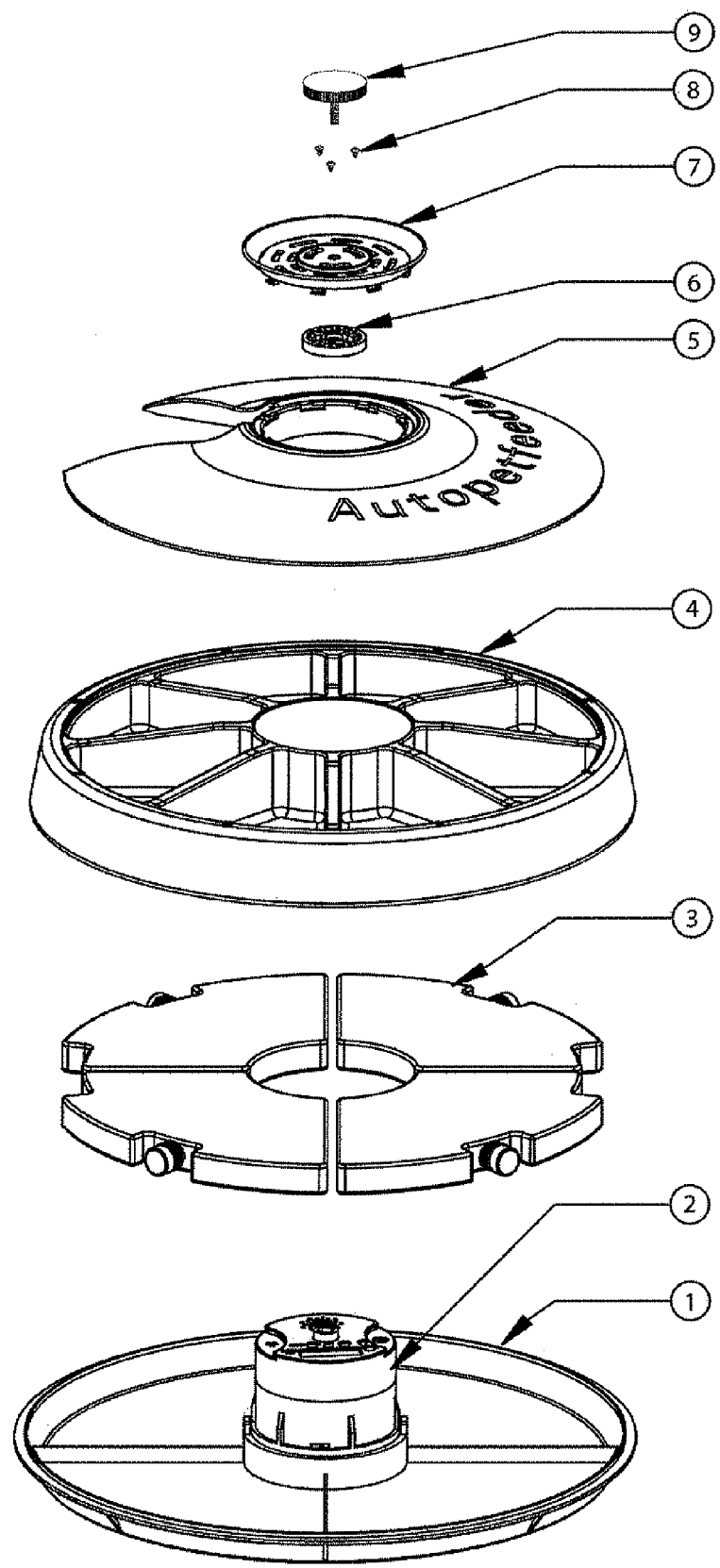
FIG. 1 is an exploded perspective view showing the individual components of the device.
Figure 4:
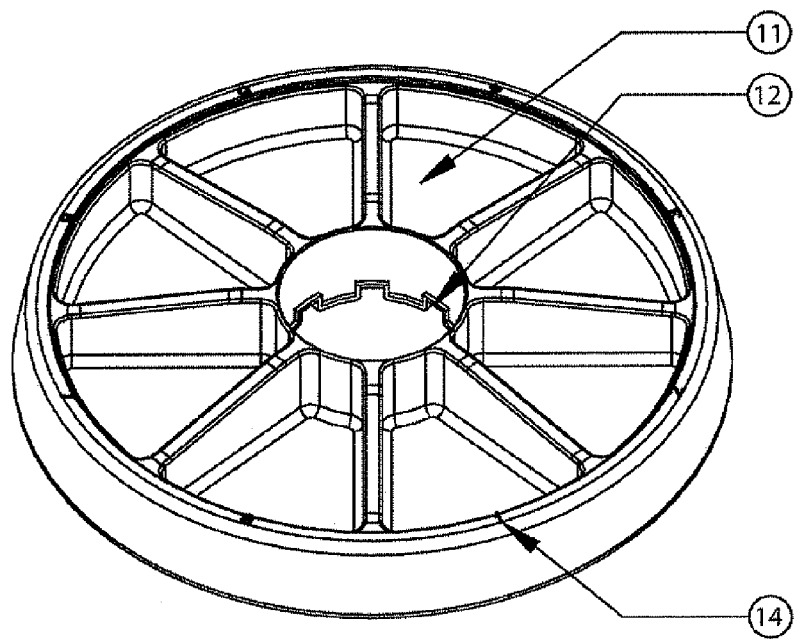
FIG. 4 is a perspective view of the bowl.
Figure 5:
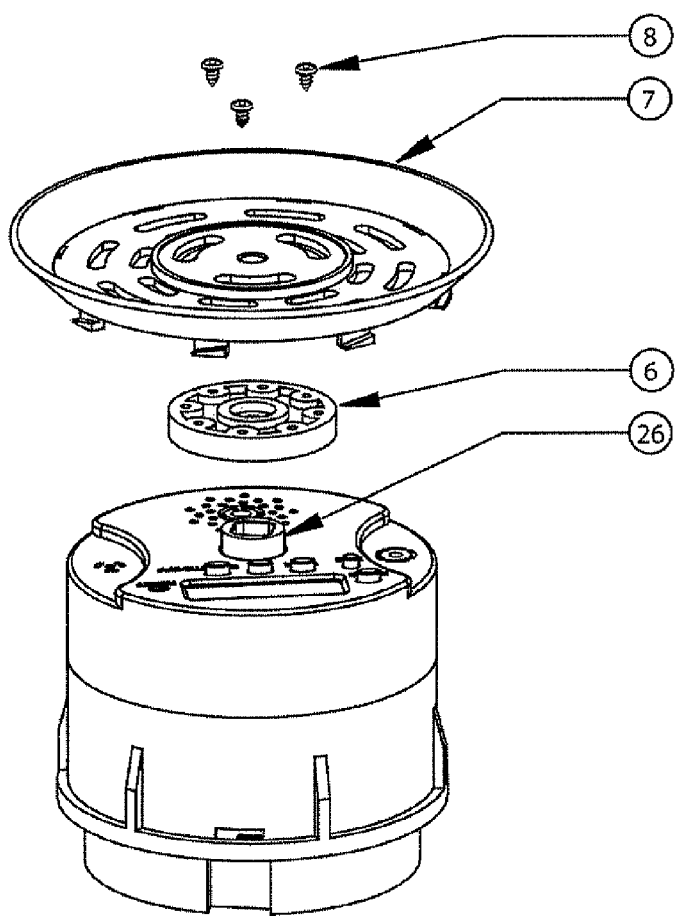
FIG. 5 illustrates the timer to bowl cover alignment

FIG. 1 details the individual components of the Automatic Pet Feeder. The feeder consists of a base 1, the timer control module 2, freezer pack 3 to keep the food cold and the food storage bowl 4. This food storage bowl may be designed as small as 10 inches in diameter or as large as it is required depending on the nature of use, size of food or medication. The depth of the bowl may also be varied. If desired the bowls may be designed with separations for food and water. The smaller units could be designed specifically for smaller animals or for dispensing treats and medication. The number of pie shaped pockets or feed chambers can also range anywhere from two to eight or more in the bowl. The bowl is placed on the base and it lines up to the base along one of the eight notches 12 in FIG. 4. This provides for alignment of the feeder bowl to the base. The timer is installed on the base 1 with two screws 32 (FIG. 7) and these screw holes in the base 1 are positioned with reference to these notches 12 on the bowl. The bowl cover handle 7 is attached to the bowl cover 5 by 10 degree turn and lock mechanism. The handle can be ergonomically designed and may be easily replaced in the event the handle is broken. The handle could also be molded as part of the cover if necessary. The bowl cover handle 7 is attached to a round ring with square pin 6 with three screws 8. The round ring with square pin 6 in FIG. 5 fits into the rotatable shaft 26 in the timer module 2. The bowl cover handle has circular slots wherein the screws 8 can be loosened and the round ring with square pin 6 can be rotated to enable alignment of the bowl cover 5 to the bowl 4. After the bowl cover is aligned to the one of the openings in the bowl 4 (first index position) the screws 8 are screwed tight. This configuration provides for alignment of the feeder bowl cover 5 to the timer 2, timer 2 to the base 1 with the help of the screws 32 and base 1 to the bowl 4. As a result the feeder handle 7 connected to the feeder cover 5 can be controlled by the timer and aligned perfectly to bowl's pie shaped openings. Finally the lock screw 9 secures the entire handle and cover assembly to the timer.

Figure 2:
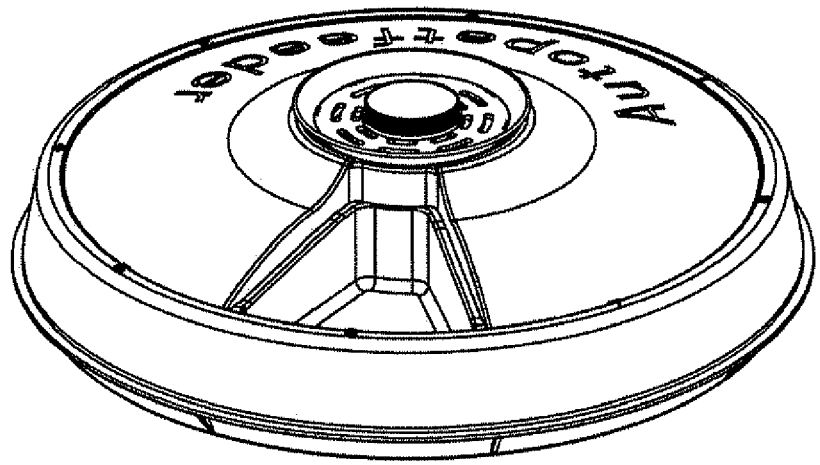
FIG. 2 is a perspective view of the assembled device.
Figure 3:
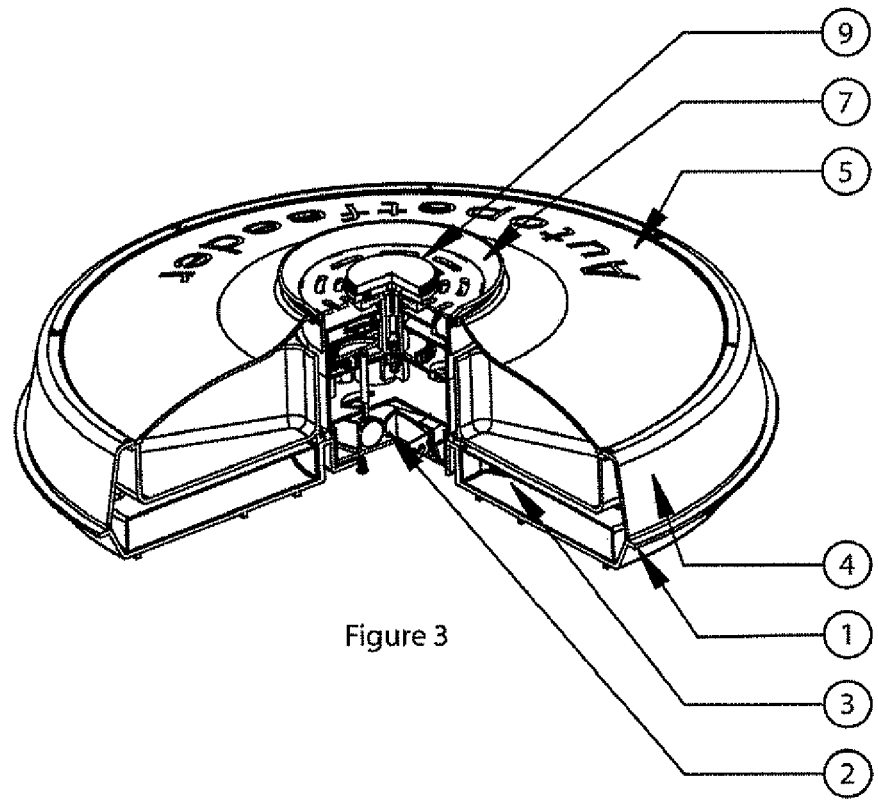
FIG. 3 is a perspective view in partial cross section of the device.

In FIG. 2, a complete assembly of the feeder is seen. FIG. 3 also details the placement of all the components 1 to 9 with reference to each other. The timer module controls the entire operation of the feeder, and determines when the feeder cover is indexed so that the pet may have access to the food. This could be decided by the program on the timer or by an external device that interfaces with the timer.

The timer consists of a LCD display 18 as a user interface to provide feed back during programming and operation. The clock displays the time in hours 15 minutes 16 and seconds 17. The clock (current time) can be set using the hour button 27 and the minute button 24. The clock can be set for an AM/PM mode or military style 24 hours by pressing the hour 27 and minute 24 buttons simultaneously. Programming of the timer is accomplished by pressing the program button 30 and using the hour 27 and minute 24 buttons. The pet owner can record his or her voice, calling out for the pet to come and eat. By pressing the record button 31 the microphone 29 records the voice into the system microprocessor. This recording can be long or short, as long as there is sufficient storage memory available for the voice in the memory module within the processor. The amount of recording time is displayed on the display at location 28. Many pet owners bond very closely to their pets and believe that pets would actually come to eat at the sound of their voice from the speaker 25. The owner's voice is also a comforting feature for the pet in the absence of the owner. However, given power constraints in a small module and expecting a pet to hear the recorded voice 100 feet away is impractical. As an attention grabber, a pre-recorded high frequency 35 Khz to 40 Khz is played back by the timer module, for a period of 2 seconds, every time the cover indexes, prior to playing back the owners recording. This high frequency sound is not heard by the pet owner and only by the pet. This trains the pet to go to the machine to feed whenever the cover moves and when the owner's voice is played back. The two-second tone can be increased, decreased, enabled or disabled in the microprocessor depending on the requirements or use of the product. The reset button 21 allows for resetting all the features to factory settings. This button is recessed within the timer case so as to prevent accidental activation. The ON/AUTO/OFF button 23 provides for testing the unit, turning the machine ON or OFF and also for setting the program to perform its automated functions. The timer is a digital control device; it can be programmed to feed at any time of day. Programming can be done for 8 days (limited to the maximum number of pie shaped bowls) or one day. Each program will be executed at the time that is programmed for. Example in the case of a timer that is capable of eight programs with eight pie shaped food chambers is shown Table 1 below.

TABLE 1

| No. Of Programs | No of Feeds/Day | | | | | | | |
|---|---|---|---|---|---|---|---|---|
| | Day 1 | Day 2 | Day 3 | Day 4 | Day 5 | Day 6 | Day 7 | Day 8 |
| 1 | 1 | 1 | 1 | 1 | 1 | 1 | 1 | 1 |
| 2 | 2 | 2 | 2 | 2 | | | | |
| 3 | 3 | 3 | 2 | | | | | |
| 4 | 4 | 4 | | | | | | |
| 5 | 5 | 3 | | | | | | |
| 6 | 6 | 2 | | | | | | |
| 7 | 7 | 1 | | | | | | |
| 8 | 8 | 0 | | | | | | |

This capability allows for consumers to mix food with medication and feed them to their pets at the exact time every day, versus being forced to use 6 hour or 12 hour repeat cycle timers.

The timer also has an infrared (IR) sensor 22 and or a radio frequency (RF) control receiver that allows for user input using an IR or RF remote control device to program and or operate the timer for training purposes. The timer provides for communication via a serial port DB9 connector or regular USB port 40 (FIG. 7) beneath the timer. This port can also be configured to charge the batteries in the timer to enable using the timer with rechargeable batteries. Communication to the timer's microprocessor can be done through a computer or pre-programmed microprocessor modules for use in laboratory and test environments. This feature enables this invention to interact and talk with various other training devices.

Figure 6:
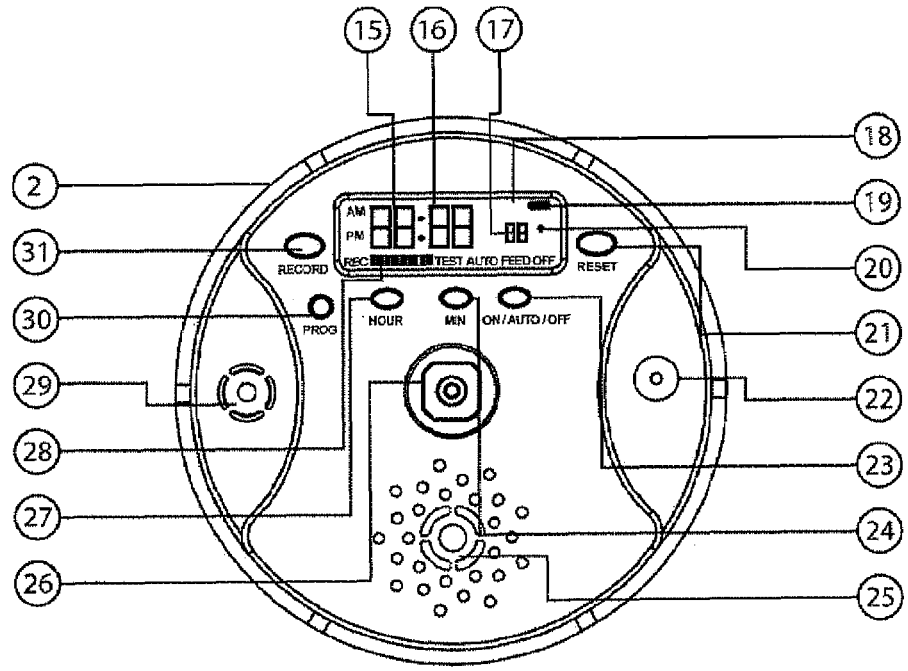
FIG. 6 is a top view of the timer module.
Figure 7:
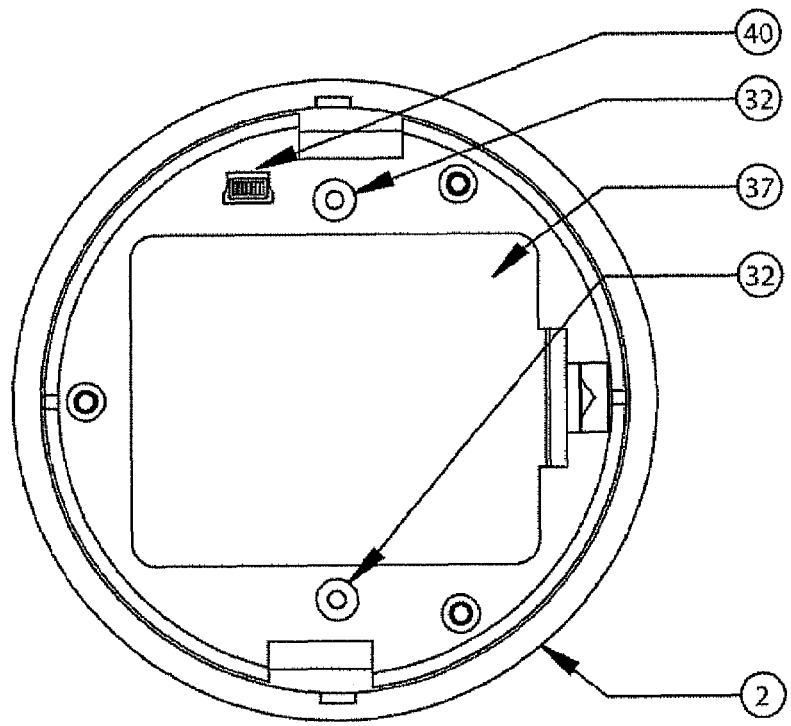
FIG. 7 is a bottom view of the timer module.
Figure 8:
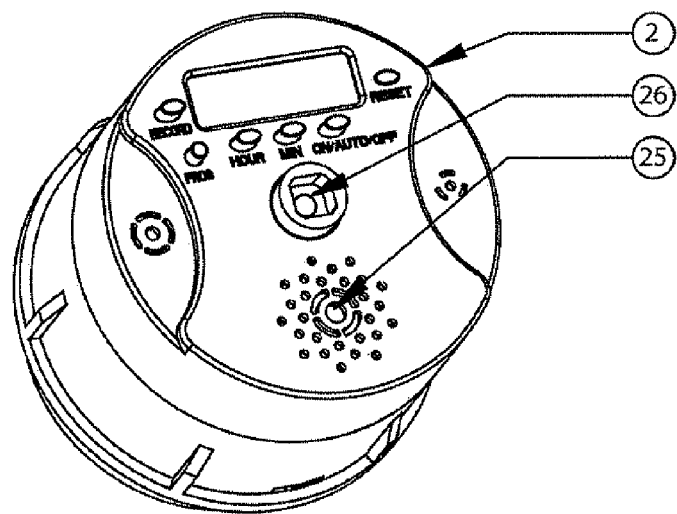
FIG. 8 is a perspective view of the timer module.
Figure 9:
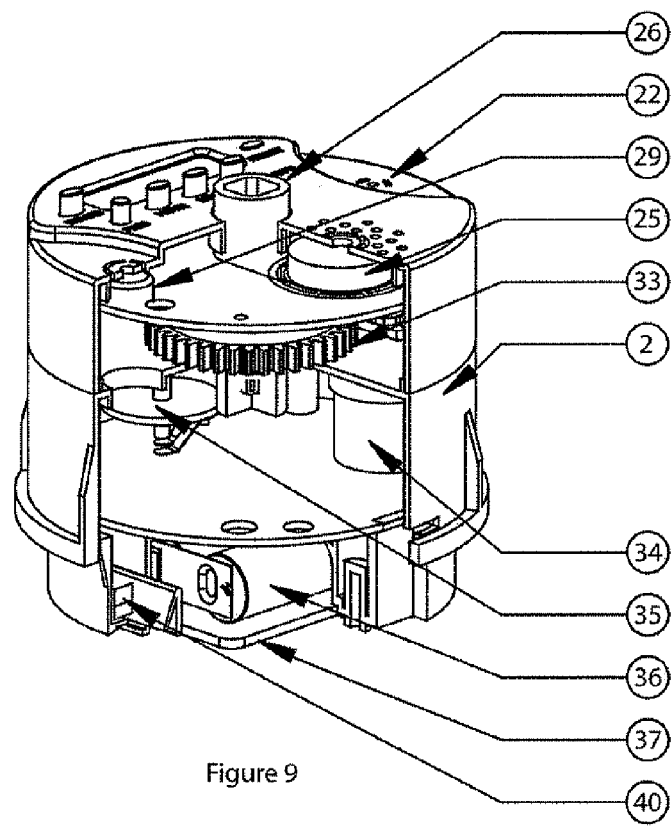
FIG. 9 is a perspective view of the timer module with portions removed to show detail.

The timer module 2 consists of a cylindrical plastic shell with top side being the user interface (FIG. 6) and the bottom side containing the battery compartment 36 (FIG. 9). The battery compartment cover 37 along with a USB port interface 40, for external connections, are located on bottom side of the timer module (FIG. 7). The timer derives its power from the battery and displays the power level 19 on the LCD screen 18. In the event power levels are insufficient for the operation of the timer, the timer starts to beep at regular intervals to alert the user to replace the batteries in the battery compartment 36.

Figure 10:
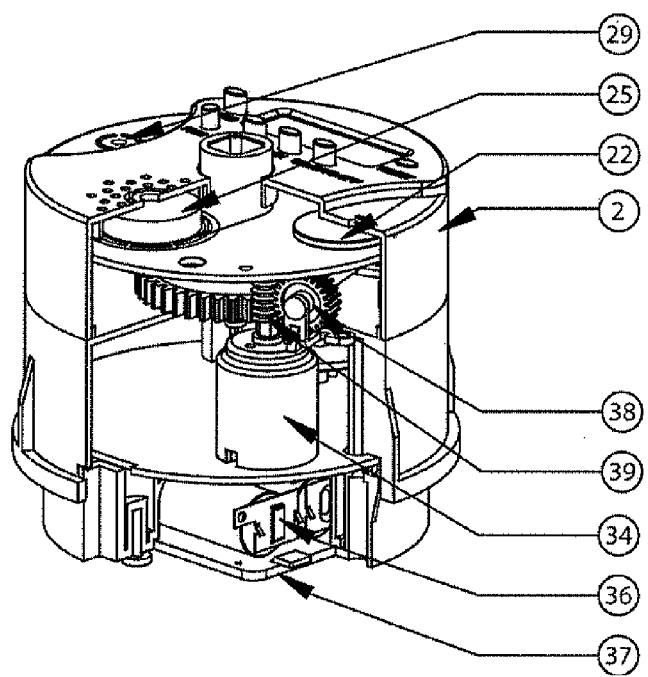
FIG. 10 is a perspective view of the timer module similar to FIG. 9.
Figure 11:
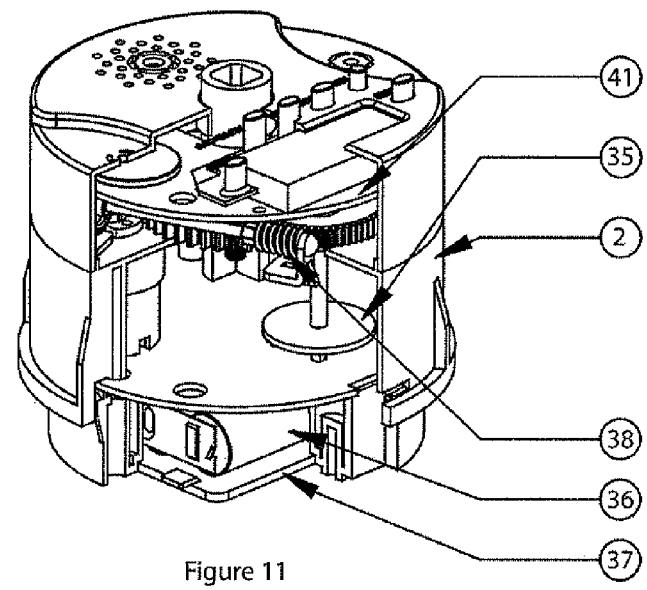
FIG. 11 is a perspective view of the timer module similar to FIG. 9.

The timer module consists of three major components. These are: high speed motor 34, position sensor 35, gear train (33 in FIG. 9, 38 and 39 in FIG. 10) and a microprocessor LED with circuit board 41 in (FIG. 11). When the feeder initiates a feed cycle, it is the microprocessor that initiates the command. The processor receives all the commands from the user interface (FIG. 6) and or also from the IR sensor/RF sensor 22 and USB port 40 as necessary and then initiates the motor 34 to start. The motor starts to spin at high speed with low levels of torque. The gear train 33, 38 and 39 converts this to low speed high torque and transfers this angular motion to the timer module receiver 26. This rotation initiates the rotation of the feeder cover to open the next food compartment.

The microprocessor having initiated the feed cycle awaits the signal from the position sensor 35 to tell it that the predetermined angular distance has been reached and then shuts off the motor. This angular distance/position is 45 degrees for a feeder with 8 feed chambers. This can be adjusted depending on the number of pies that the feed bowl has. In a six bowl feeder this angle is 60 degrees and a 10 bowl feeder this angle is 36 degrees.

It is well known that pets will do anything to gain access to food, particularly overweight and or aggressive pets. If the bowl cover 5 is forced by the user's hands (man or animal), the feeder cover is prevented form being rotated manually due to the position of the gears and a high gear ratio within the timer module. This is accomplished by the transfer of torque from the motor's vertical axis gear 39 (FIG. 10) to horizontal axis gear 38 (FIGS. 10, 11) and then back again to vertical axis gear 33 in (FIG. 9) on the timer module receiver 26. This feature prevents the pets from placing their paw on the feeder cover and trying to rotate the cover manually to gain access to the food in the other compartments. Furthermore the lock screw 9 prevents the pets from removing the cover completely off the feeder. Hence, the feeder is locked down completely from manual/pet intervention.

MODE OF OPERATION

Three AA batteries are installed in the bottom of the feeder and the cover lock screw 9 is removed from the top of the timer. The cover 7 is lifted using the bowl cover handle 5 of the device. The clock is set to AM/PM or 24 hour mode, and the number of programs as per the user needs is set. The voice is recorded that the user would like the pet to hear. Then, the timer is tested by pushing the AUTO/ON/OFF button. Food or treats are placed in the bowl, and then the cover is placed on the machine and using the lock screw 9 to lock down the cover. Next, the pet needs to be trained to eat from the machine.

The first and foremost step is to train the pet to eat regularly from the pet feeder. The pet may take a few days to get accustomed to feeding from such a feeding device. To train the pet to eat from the machine, treats and or hand feeding the pet should not be done for a few days. This will force the pet to have to eat from the feeder when it gets hungry. This will also train the pet to get used to the new feeding machine. A treat may be provided after the pet has eaten from the machine, to encourage him to feed from the machine. Another way to train the pet is to place their favorite treat in the machine and program the machine to dispense it 4 to 5 times a day for a few days. Also place the pet's regular meals in its normal bowl close to the machine. This will get the pet acclimatized to the machine and when its meal is provided in the machine, they will feed from the machine.

What is claimed is:
1. An automatic pet feeder
   a programmable, removable timer module comprising a microprocessor to control the function of said timer module and a rotatable member;
   a base having a central portion adapted to seat the timer module;
   a bowl seated on the base having a central portion forming part of a housing for the timer module and having a plurality of similarly-shaped food receiving compartments;

a cover adapted to overlie the bowl having a central opening to provide access to the time module and a further opening corresponding in size and shape to one of the food receiving compartment;

a handle for operatively securing the cover to the rotatable member of the time module and for aligning the further opening in the cover with respect to the food-receiving compartments and the bowl; and a locking member for securing the handle and cover to the timer module so that the cover rotates in response to rotation of the rotatable member;

wherein the timer module comprises an infrared sensor and a radio frequency receiver to allow the use of a remote control to control and program the microprocessor.

2. The automatic pet feeder of claim 1, wherein said food receiving compartments in the bowl are pie shaped and number 2 or more.

3. The automatic pet feeder of claim 1, wherein the bowl has a plurality of notches and is seated on the base along a corresponding plurality of raised members on the base.

4. The automatic pet feeder of claim 1 wherein said handle is attached to the cover by a turn and lock mechanism.

5. The automatic pet feeder of claim 4, wherein said handle is formed integrally with the cover.

6. The automatic pet feeder of claim 1, wherein the handle is secured to the timer module with one or more screws and said handle has circular slots wherein the screws may be loosened to align the cover to the bowl.

7. The automatic pet feeder of claim 1, wherein said timer module is connected to an external device that interfaces with the timer.

8. The automatic pet feeder of claim 7, wherein the timer module includes an LCD display unit to facilitate programming and operation.

9. The automatic pet feeder of claim 1 further comprising a serial port DB9 connector or USB port beneath the timer module.

10. The automatic pet feeder of claim 9, further comprising batteries for powering the timer module and wherein the port is configured to charge the batteries.

11. The automatic pet feeder of claim 1, wherein the timer module further comprises a microphone for sound recording and speaker for playback.

12. The automatic pet feeder of claim 11, wherein the timer module is programmed with a pre-recorded high frequency sound of between 35 Khz to 40 Khz that is played back by the timer module for a pre-determined number of seconds.

13. The automatic pet feeder of claim 1, wherein the timer module consists of a cylindrical shell with a battery compartment in the bottom and a user interface on the top.

14. The automatic pet feeder of as claimed in claim 1, wherein the timer module comprises of a high speed motor, a position sensor, a gear train and a microprocessor LED circuit board.

15. The automatic pet feeder of claim 14, wherein the gear train has a gear ratio sufficient to prevent manual rotation of the cover.

16. An automatic pet feeder
a programmable, removable timer module comprising a microprocessor to control the function of said timer module and a rotatable member;

a base having a central portion adapted to seat the timer module;

a bowl seated on the base having a central portion forming part of a housing for the timer module and having a plurality of similarly-shaped food receiving compartments;

a cover adapted to overlie the bowl having a central opening to provide access to the time module and a further opening corresponding in size and shape to one of the food receiving compartments;

a handle for operatively securing the cover to the rotatable member of the time module and for aligning the further opening in the cover with respect to the food-receiving compartments and the bowl; and a locking member for securing the handle and cover to the timer module so that the cover rotates in response to rotation of the rotatable member;

wherein the timer module comprises a high speed motor, a position sensor, a gear train and a microprocessor LED circuit board.

* * * * *